United States Patent
Bolshinsky et al.

(10) Patent No.: US 10,831,788 B2
(45) Date of Patent: Nov. 10, 2020

(54) DETERMINING A GROUP RECOMMENDATION

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 14/820,590

(22) Filed: Aug. 7, 2015

(65) Prior Publication Data

US 2017/0039270 A1     Feb. 9, 2017

(51) Int. Cl.
| | |
|---|---|
| G06F 16/00 | (2019.01) |
| G06F 16/28 | (2019.01) |
| G06F 16/9535 | (2019.01) |
| G06F 16/2457 | (2019.01) |
| H04W 4/21 | (2018.01) |

(52) U.S. Cl.
CPC ...... G06F 16/288 (2019.01); G06F 16/24575 (2019.01); G06F 16/24578 (2019.01); G06F 16/285 (2019.01); G06F 16/9535 (2019.01); H04W 4/21 (2018.02)

(58) Field of Classification Search
CPC ......... G06F 17/30604; G06F 17/30528; G06F 17/3053; G06F 17/30598; G06F 17/30867; G06F 16/288; G06F 16/285; G06F 16/24575; G06F 16/9535; G06F 16/24578; H04W 4/21

USPC ........ 707/728; 715/733, 753; 709/219, 204, 709/206

See application file for complete search history.

(56) References Cited

U.S. PATENT DOCUMENTS

| | | | |
|---|---|---|---|
| 7,418,268 B1 | 8/2008 | Cabano et al. | |
| 8,560,678 B2 | 10/2013 | Tseng | |

(Continued)

FOREIGN PATENT DOCUMENTS

| | | |
|---|---|---|
| CA | 2648800 A1 | 9/2007 |
| EP | 2688034 A1 | 1/2014 |

(Continued)

OTHER PUBLICATIONS

Raad et al., "User profile matching in social networks"; Network-Based Information System (NBiS), Sep. 2000, Japan, pp. 297-304.*

(Continued)

*Primary Examiner* — Monica M Pyo
(74) *Attorney, Agent, or Firm* — Isaac J. Gooshaw

(57) ABSTRACT

A method, computer program product, and computer system is provided. A processor identifies a shared property between a user of a social network and a group of the social network. A processor identifies an unshared property between the user of the social network and the group of the social network. A processor determines a first percentage of the one or more members of the group with the shared property. A processor determines a second percentage of the one or more members of the group with the unshared property. A processor generates a recommendation score for the group based, at least in part, on the first and second percentage.

15 Claims, 5 Drawing Sheets

(56) References Cited

U.S. PATENT DOCUMENTS

| | | | |
|---|---|---|---|
| 8,682,918 B2 | 3/2014 | Ramanujam | |
| 8,938,512 B2 | 1/2015 | Jackson et al. | |
| 8,959,153 B2 | 2/2015 | Mallet et al. | |
| 2006/0218153 A1 | 9/2006 | Voon et al. | |
| 2008/0077529 A1 | 3/2008 | Swanburg | |
| 2009/0170536 A1* | 7/2009 | Rang | G06F 40/274 455/466 |
| 2011/0213801 A1* | 9/2011 | He | G06F 16/24556 707/770 |
| 2011/0270774 A1 | 11/2011 | Varshaysky et al. | |
| 2012/0110458 A1* | 5/2012 | Brown | G06F 17/30731 715/733 |
| 2012/0158715 A1* | 6/2012 | Maghoul | G06F 17/30867 707/728 |
| 2012/0311030 A1* | 12/2012 | Lin | G06F 15/16 709/204 |
| 2013/0031090 A1* | 1/2013 | Posse | G06F 17/30867 707/723 |
| 2013/0080524 A1 | 3/2013 | Rubinstein et al. | |
| 2013/0117364 A1* | 5/2013 | Bania | G06Q 50/01 709/204 |
| 2013/0346233 A1 | 12/2013 | Caralis et al. | |
| 2014/0012926 A1 | 1/2014 | Narayanan et al. | |
| 2014/0013240 A1 | 1/2014 | Ganesh | |
| 2014/0032587 A1* | 1/2014 | Sankar | G06F 17/30967 707/759 |
| 2014/0201626 A1 | 7/2014 | Bidamon | |
| 2014/0207912 A1* | 7/2014 | Thibeault | H04L 65/4084 709/219 |
| 2015/0370798 A1* | 12/2015 | Ju | G06F 17/30867 707/748 |

FOREIGN PATENT DOCUMENTS

| | | |
|---|---|---|
| WO | 2013017864 A1 | 2/2013 |
| WO | 2013180704 A1 | 12/2013 |

OTHER PUBLICATIONS

Guy et al., "Social Media Recommendation based on People and Tags", SIGIR '10, Jul. 19-23, 2010, Geneva, Switzerland, pp. 194-201.*

Sigalit Ur et al., "Do You Want to Know? Recommending Strangers in the Enterprise", CSCW 2011, Hangzhou, China, Mar. 10-23, 2011, 10 pages.*

Sigalit Ur et al., "Do You Want to Know? Recommending Strangers in the Enterprise", SCSW 2011, Mar. 19-23, 2011, Hangzhou, China, 10 pages.*

Inbal Ronen et al., "Do you Know? Recommending People to Invite into Your Social Network", IUI '09, Feb. 8-11, 2009, Sanibel Island, Florida, USA, 10 pages.*

Boratto, Ludovico, "Groups Identification and Individual Recommendations in Group Recommendation Algorithms", Workshop on the Practical Use of Recommender Systems, Algorithms and Technologies (PRSAT 2010), held in conjunction with Rec-Sys 2010. Sep. 30, 2010, Barcelona, Spain, 8 pages.

Roy et al., "Exploiting Group Recommendation Functions for Flexible Preferences", ICDE Conference 2014, © 2014, IEEE, pp. 412-423.

Yuan et al., "COM: a Generative Model for Group Recommendation", KDD'14, Aug. 24-27, 2014, New York, NY, USA, Copyright 2014 ACM, pp. 163-172.

* cited by examiner

DETERMINING A GROUP RECOMMENDATION

BACKGROUND OF THE INVENTION

The present invention relates generally to providing recommendations in a social network. More specifically, the techniques described herein include determining a group recommendation for user in a social network.

A social network comprises numerous users who create relationships with one another in order to share content. The users typically have similar interests with each other that serve as the catalyst for collaborating with similar users that are part of the social network. The similar interests serve as a basis for users to form relationships or contact within the social network. Users collaborate with other users having similar interests by creating and joining groups to deliver content to likeminded individuals. As members of a group post content to the social network, that content is shared with the other members.

SUMMARY

Embodiments of the present invention provide a method, system, and program product to determine group recommendations for a social network. A processor identifies a shared property between a user of a social network and a group of the social network. A processor identifies an unshared property between the user of the social network and the group of the social network. A processor determines a first percentage of the one or more members of the group with the shared property. A processor determines a second percentage of the one or more members of the group with the unshared property. A processor generates a recommendation score for the group based, at least in part, on the first and second percentage.

DETAILED DESCRIPTION

Figure 1:
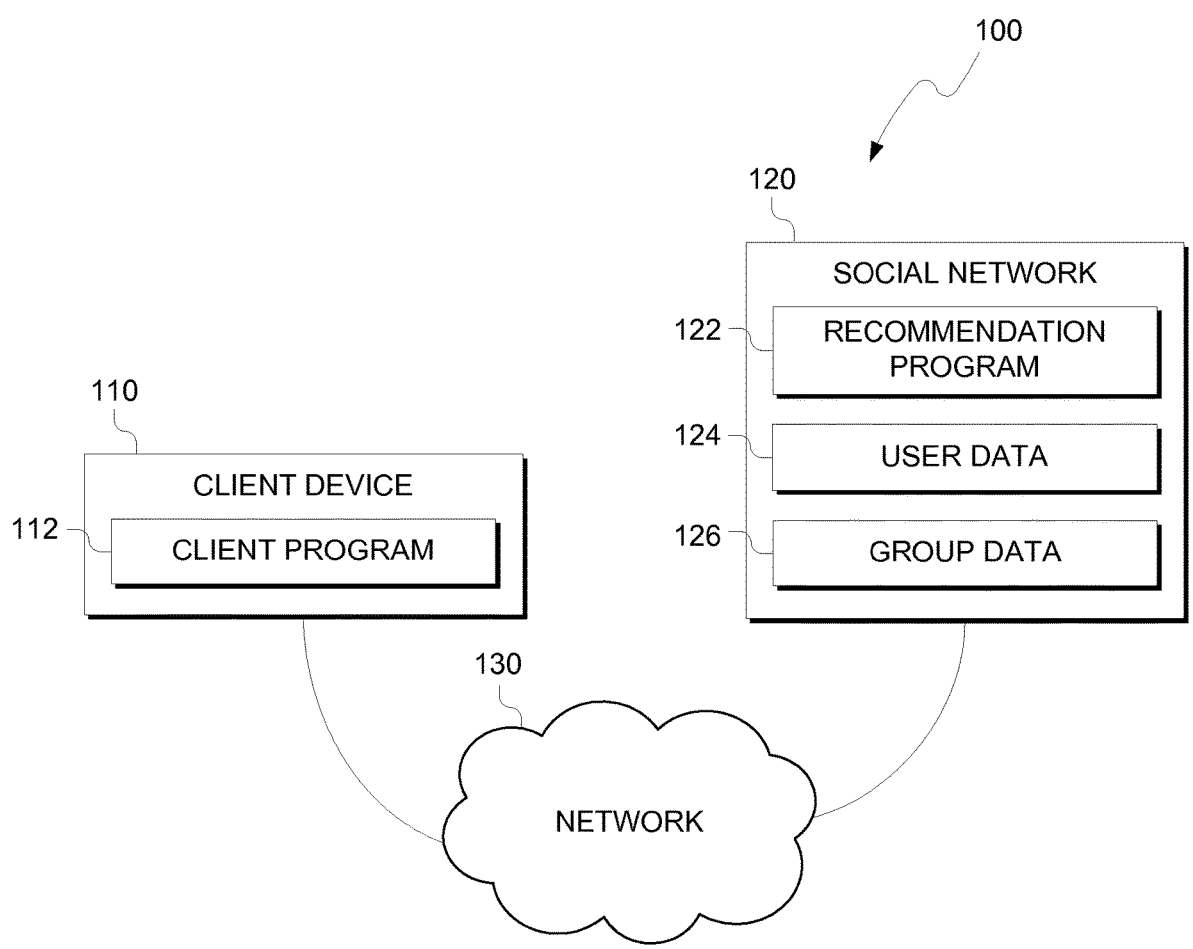
FIG. 1 is a functional block diagram illustrating a networked environment, in accordance with an exemplary embodiment of the present invention.

While solutions to recommending groups to join are known, previous solutions are only concerned with suggesting groups to join based on similarities between the user and the suggested groups. Embodiments of the present invention recognize that factoring in dissimilarities between members of a group and the user provides a better and more targeted suggestion of potential groups for the user to join. For example, a user may enjoy hiking. However, a hiking group based in a different country may not be a good match for the user. By weighing in both the similarities and dissimilarities a user has with the members of a group, more relevant suggestions are provided when a user is looking to join a group on a social network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes client device 110 and social network 120 connected over network 130. Client device includes client program 112. Social network 120 includes recommendation program 122, user data 124 and group data 126.

In various embodiments of the present invention, client device 110 and social network 120 are each a computing device that can be a standalone device, a server, a laptop computer, a tablet computer, a netbook computer, a personal computer (PC), or a desktop computer. In another embodiment, client device 110 or social network 120 each represent a computing system utilizing clustered computers and components to act as a single pool of seamless resources. In general, client device 110 and social network 120 can each be any computing device or a combination of devices with access to user data 124 and group data 126 and is capable of executing client program 112 and recommendation program 122. Each of client device 110 or social network 120 may include internal and external hardware components, as depicted and described in further detail with respect to FIG. 4.

In this exemplary embodiment, client program 112 is stored on client device 110. Recommendation program 122, user data 124 and group data 126 are stored on social network 120. However, in other embodiments, client program 112, recommendation program 122, user data 124 and group data 126 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between client device 110 and social network 120, in accordance with a desired embodiment of the present invention.

In various embodiments, client device 110 includes client program 112 to interact with a social network platform, such as social network 120. Client device 110 may be any device capable of communicating with social network 120 such as, but not limited to, a desktop, laptop, tablet, smart phone, wearable device or the like. Client program 112 includes modules or code to perform numerous interaction with social network 120. For example, a user may post messages or other content to a page associated with the user (e.g., a home page or wall). Furthermore in some embodiments, client program 112 may receive a request to find groups to for the user to join. For example, a user may provide a topic of interest to find groups with similarly minded members of social network. In other embodiments, client program 112 may display recommendations for groups to join without a request from the user.

In various embodiments, social network 120 includes various programs and modules (not shown) to post and share content with other users of social network 120. As a user joins the social network, programs or modules of social network 120 receive information from the user describing a variety of attributes or properties associated with the user. For example, a user may provide their name, gender, age, nationality, home location, work location, interests, fluent languages, or any other information describing the user and potential interests of the user. User data 124 includes profiles for each user of social network 120 including the properties associated with each user, as discussed herein. Additionally, user data 124 includes a list of groups of social network 120 the user has joined. Social network 120 includes group data 126. Group data 126 includes entries for each group of social network 120. The entries include a list of users who are members of each group. In some embodiments, group data 126 may include a description or other information describing each group.

In various embodiments, social network 120 includes recommendation program 122 to determine recommendations of one or more groups of social network 120 for a user to join. In some embodiments, recommendation program 122 may receive a query or information, via client program 112, to find a certain type of group. For example, a user may solicit a group recommendation for groups with cycling enthusiasts. In other embodiments, recommendation program 122 may provide unsolicited recommendations automatically to the user as the user interacts with client program 112. For example, a group suggestion interface may be displayed via client program 112 as the logs on and is directed to the user's home page. As another example, as the user views a particular groups page in social network 120, recommendation program 122 may suggest similar groups based on attributes of the group. In an embodiment, recommendation program 122 provides an ordered list of recommendations for groups to join, where the order is based on a recommendation score. In another embodiment, provides a recommendation of the group, or a limited amount of groups (e.g., three groups), with the highest recommendation score of groups.

In various embodiments, recommendation program 122 determines a recommendation score for one or more groups in group data 126 for a particular user. Recommendation program 122 identifies the properties of the user and, for each group, the properties of each user that is a member of the group. Recommendation program 122 determines a percentage of current members of the group that share, or have in common, properties associated with the user that the group recommendation is being determined. For example, if the user is male, then recommendation program 122 determines the percentage of males that are members of each group. In some embodiments, if a search query or filter is received, recommendation program 122 only identifies the member properties of groups that match or satisfy the query or filter.

In various embodiments, recommendation program 122 determines a percentage of current members of the group that do not share, or do not have in common (e.g., unshared), properties of the user. For example, if a user's profile in user data 124 indicates that the user speaks Spanish, the recommendation program 122 determines the percentage of the group that does not speak Spanish. In various embodiments, recommendation program 122 determines the percentages of each group for each property indicated in a user's profile in user data both the percentage of group members that share each property and the percentage of group members that do not share each property. For some attributes of a user profile, such as gender or nationality, unshared properties are values not equal to the value in a profile of a user (e.g., for the gender attribute a male property is an unshared property of female, and vice versa). For other properties, a range may be associated with the value in the profile of the user. For example, a user's age is twenty-five. Recommendation program 122 determines shared properties regarding age include a range of +/−5 years from the age of the user (e.g., users 20-30 years old share the age property with the user, and users 0-19 and 31 and above have an unshared age property).

In various embodiments, for all attributes of the user's profile, recommendation program 122 applies a weight to each percentage of a group's properties, both shared and unshared with the user. For example, a user's profile has the property "female" for the gender attribute and the property "Canada" as the home country attribute. Recommendation program 122 determines a percentage of each group for potential recommendation that shares a property (e.g., is 'female') and those that do not share the property (e.g., is 'male'). For each pair of shared and unshared properties, recommendation program 122 applies a weight to the determined percentage. Recommendation program 122 adds the weighted percentages for each of the shared and unshared properties to determine a respective shared property score and an unshared property score. Details for determining both the shared property score and the unshared property score for a group when compared to a user may be expressed by Equations E.1 and E.2 below:

$$SPS = \sum_{i=1}^{n} \text{Weight}(SP_i) * \text{Percentage}(SP_i) \quad \text{(E. 1)}$$

$$UPS = \sum_{j=1}^{m} \text{Weight}(UP_j) * \text{Percentage}(UP_j) \quad \text{(E. 2)}$$

Referring to E.1, for each shared property (i.e., $SP_i$), recommendation program 122 determines a percentage (i.e., Percentage($SP_i$)) of the group members that share the property. Recommendation program 122 determines the shared property score (i.e., SPS) for a group by determining a weighted (i.e., Weight($SP_i$)) summation of all the determined percentages for all properties (i.e., [1, n]) shared by the group and the user. Referring to E.2, for each unshared property (i.e., $UP_j$), recommendation program 122 determines a percentage (i.e., Percentage($SP_j$)) of the group members that do not share the property. Recommendation program 122 determines the unshared property score (i.e., UPS) for a group by determining a weighted (i.e., Weight($SP_j$)) summation of all the determined percentages for all properties (i.e., [1, m]) not shared by the group and the user.

In some embodiments, recommendation program 122 determines a weight for a given property based on the percentage of members who either share or do not share the property with the user that the recommendation is being determined. For example, a group is mainly composed of residents of a given country and the user is also a resident of the country. Therefore, recommendation program 122 determines a larger weight to be assigned to the percentage for the property. Similarly, the weight for unshared properties may be larger for unshared proprieties with a higher percentage than other unshared properties with lower percentages. As such, properties that are either highly shared or unshared (i.e., high Percentage($SP_i$) and Percentage($UP_i$) values) are weighted more than properties with lower percentages. This provides a boost to properties that are highly in common within the group and shared with the user (i.e., Percentage($SP_i$)), causing a greater effect on the shared property score when recommending the group. Similarly, unshared properties that are highly common in the group but not shared with the user (i.e., Percentage($UP_i$)), are given a higher weight to boost the unshared property score when recommending the group.

For example, if a group includes members that all only speak English and the user speaks French, the weight for the unshared property score may be larger than the shared property score, since the percentage would be higher with unshared properties (e.g., members who speak English and languages other than French) versus the percentage of shared properties (e.g., members who speak French). In a scenario, either the weight for shared properties or unshared properties may be required to have a threshold percentage to be considered when determining a recommendation score. For example, if the percentage is above 60%, a weight is applied. If the shared property is below 60% then the weight may be zero. In this scenario, properties shared by a low percentage of group members will not be considered when determining a recommendation.

In other embodiments, the weights of either shared properties or unshared properties may be uniform to give preference to one of the property types (i.e., shared or unshared) while the other property type is given variable weights based on the percentage as discussed herein. For example, a user has a profile in user data 124 that indicates the user's gender to be male and spoken language to be English. A group that a recommendation score is being determined for is comprised of 75% females and 25% males. The members of the group also have the following distribution among languages spoken: 80% English, 10% Spanish, and 10% French. For the shared properties, 25% of the group share the male property and 80% share the English speaking property. For unshared properties, 75% do not share the male property (i.e., 75% of the group are female) and 20% do not share the English speaking property (i.e., 10% speak Spanish and 10% speak French). In this scenario, recommendation program 122 is configured to apply uniform weights to shared properties and variable weights to unshared properties. Such a configuration provides scores that heavily weigh against groups that do not share properties with the user, while treating common properties with equal importance. Since two properties are considered, a uniform distribution would result in a 50% for both shared properties. As such, shared property score would be determined as 0.525 (i.e., 0.525=0.5*0.25+0.5*0.80, where 0.5 is the uniform weight applied to both percentages; 0.25 is the percentage of males; and 0.80 is the percentage of English speakers). For the unshared properties a weight is variably distributed in this scenario to boost unshared properties. Recommendation program 122 is configured to assign a 75% weight to the property with the largest percentage of members with the unshared property and 25% to the lowest. As such, unshared property score would be determined as 0.6125 (i.e., 0.6125=0.75*0.75+0.25*0.20, where 0.75 is the weight applied to gender since it is the highest unshared property of the group and 0.25 applied to language spoken, since the property is the smallest unshared property, and 0.75 being the percentage of members who do not share the male property and 0.20 being the percentage of members who do not share the language spoken property).

In various embodiments, recommendation program 122 determines a recommendation score for a group based on the shared property score and the unshared property score. Details for determining recommendation score for a group when compared to a user may be expressed by Equation E.3 and E.2:

$$RS = SPS - UPS \qquad (E.3)$$

In E.3, RS is the recommendation score, SPS is the shared property score (i.e., E.1), and UPS is the unshared property score (i.e., E.2). The subtraction of UPS from SPS determines a metric that balances the shared and unshared properties a group has with a particular user. As such the larger the recommendation score's value is the better a group will be as a recommendation for the user to join, since the shared properties outweigh the unshared properties. In the above example where SPS is 0.525 and UPS is 0.6125, the recommendation score is low (i.e., −0.0875) and therefore would not make a good recommendation. This could be attributed to the large amount of members in the group who do not share the gender property of the user. By changing the weights applied to the percentages, as discussed with regards to E.1 and E.2, recommendation program 122 can be configured to provide recommendations that favor either shared properties or unshared properties. One of ordinary skill in the art will appreciate that any arrangement or configuration of weights applied to the percentages of either shared or unshared properties can be used by recommendation program 122 without deviating from the invention. The weights may be based on, but not limited to: a design choice of an administrator of recommendation program 122; contextual or preference data of the user, the group, or a combination of both; or any other factors.

Figure 2A:
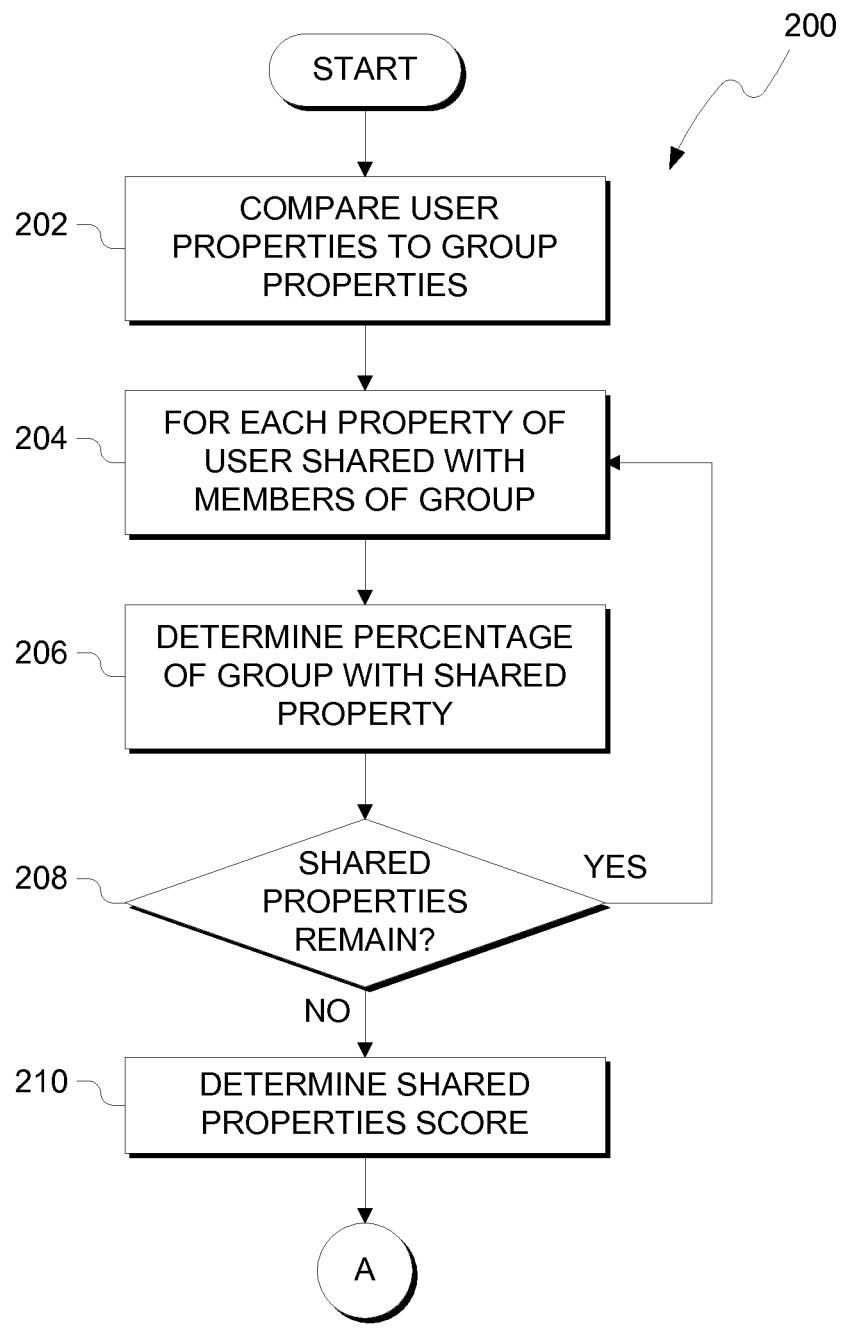
FIGS. 2A-2B illustrate operational processes of a recommendation program determining a recommendation score, on a computing device within the environment of FIG. 1, in accordance with an exemplary embodiment of the present invention.
Figure 2B:
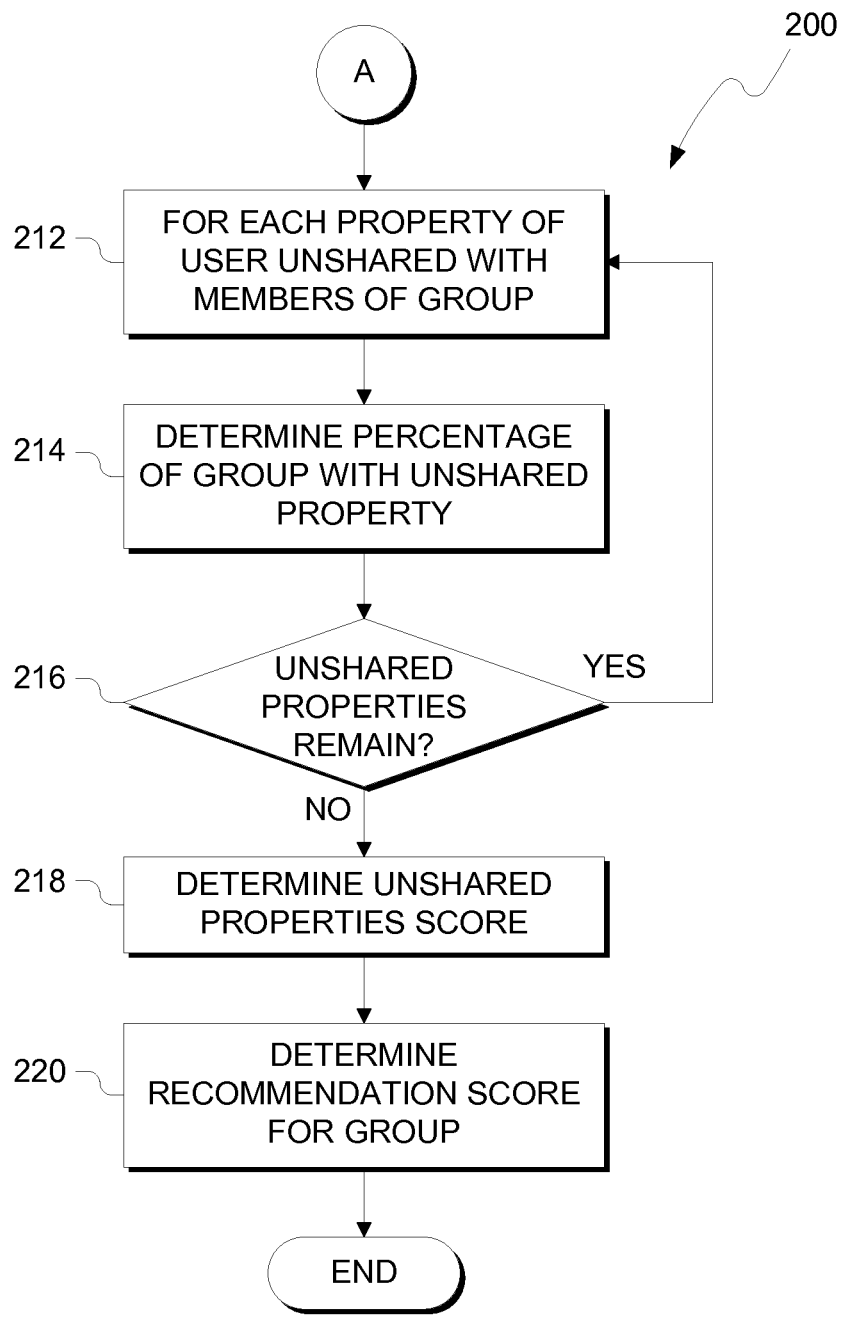

FIGS. 2A-2B illustrate operational processes, generally designated 200, of recommendation program 122 for determining a recommendation score of a group in respect to a user, on a computing device within the environment of FIG. 1, in accordance with an exemplary embodiment of the present invention. In process 202, recommendation program 122 compares the properties of a user to properties of the group. Recommendation program 122 retrieves the profile of the user in user data 124. Recommendation program 122 retrieves the members of the group from group data 126. Furthermore, recommendation program 122 retrieves the profiles of each member of the group from user data 124. As discussed herein, recommendation program 122 determines the percentage of members who share or do not share properties indicated by the user profile for the user the recommendation is determined.

In process 204, recommendation program 122 identifies each property indicated in the user's profile. For each property, recommendation program 122 determines the percentage of group members who share the properties indicated in the user's profile (process 206). Recommendation program 122 performs process 206 until no more shared properties are identified (process 208. If more properties have been identified (YES branch of process 208), then recommendation program 122 determines the percentage of group members who share the properties indicated in the user's profile for the remaining properties (processes 204 and 206). Once each shared property between the user and members of the group has been identified and a corresponding percentage of the group who share each property determined (YES branch of process 208), recommendation program 122 determines a shared property score of the group in relation to the user (process 210). Recommendation program 122 applies a weight to the percentages for each shared property. In some scenarios when determining the shared property score, recommendation program 122 applies a higher weight to properties with a higher percentages and a lower weight to lower percentages of a shared property. By doing so, recommendation program 122 will favor properties with a higher percentage of group members that share the property of the user. In other scenarios, recommendation program 122 applies a uniform distribution of weight to the percentages. In such a scenario, shared properties would be treated equally and, as a result would have less impact on the recommendation score.

In process 212, recommendation program 122 identifies each property indicated in the user's profile. For each property, recommendation program 122 determines the percentage of group members who do not share the properties indicated in the user's profile (process 214.) Recommendation program 122 performs process 214 until no more shared properties are identified (process 216). If more properties have been identified (YES branch of process 216), then recommendation program 122 determines the percentage of group members who do not share the properties indicated in the user's profile for the remaining properties (processes 212 and 214). Once each unshared property between the user and members of the group has been identified and a corresponding percentage of the group who do not share each property determined (YES branch of process 216), recommendation program 122 determines an unshared property score of the group in relation to the user (process 218). In some scenarios when determining the unshared property score, recommendation program 122 applies a higher weight to properties with a higher percentages and a lower weight to lower percentages of the unshared property. By doing so, recommendation program 122 will favor properties with a higher percentage of group members that do not share the property of the user. As such, the recommendation of the group will consider situations where a higher unshared property would indicate more group members that do not share an attribute or feature with the user. In other scenarios, recommendation program 122 applies a uniform distribution of weight to the percentages. In such a scenario, unshared properties would be treated equally and, as a result would have less impact on the recommendation score. For example, if the shared property score had a variable weight but the unshared property score weights were uniform, then recommendation program 122 would suggest a group for user that strongly shared similar properties, but would give less importance to members with dissimilar properties. Conversely, if the shared property score had a uniform weight but the unshared property score weights were variable, then recommendation program 122 would not suggest a group for a user that had a large amount of members with unshared properties.

In process 220, recommendation program 122 determines a recommendation score for the group in regards to the user that the recommendation is being determined. Recommendation program 122 determines which of the shared property score or the unshared property score has a greater value. The score with the larger value indicates the amount of members of the group that have either similar (shared) or dissimilar (unshared) interests, skills, attributes or other information indicative of the user. As shown in E.3, a difference is computed between the shared and unshared property scores. When the value is positive (e.g., the shared property score is larger), recommendation program 122 would recommend the group. In some scenarios, a threshold value may be used to determine the cutoff between recommending a group or not recommending a group. For example, the cutoff may be less than zero the encourage users to join group with unshared properties to encourage diversity in the social network. Conversely, the cutoff may be larger than zero to generate recommendations that will group like-minded or similarly situated people. One of ordinary skill in the art will appreciate that a difference between the shared and unshared property scores is not the only expression required to determine a recommendation. For example, a ratio between the scores could be determined and service as a basis for recommendation.

Figure 3:
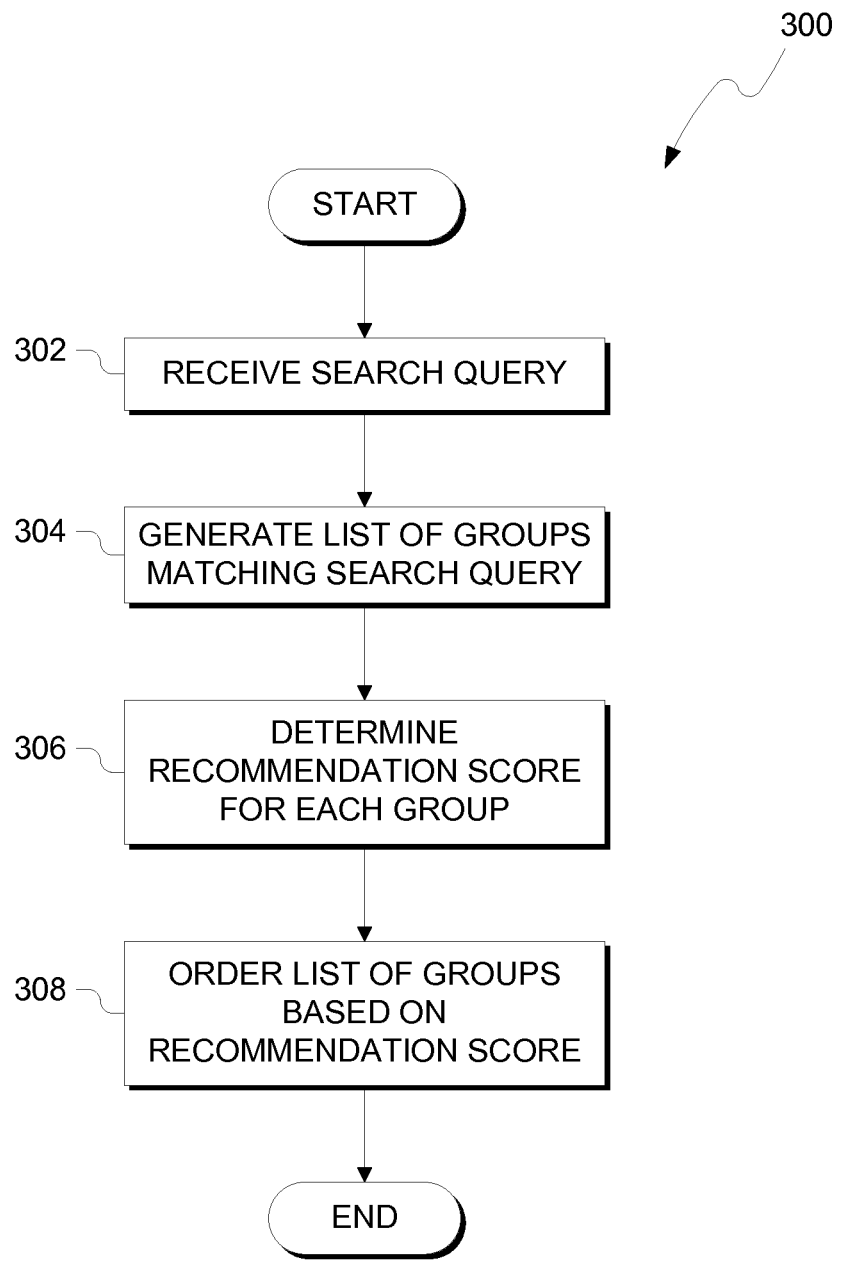
FIG. 3 illustrates operational processes of a recommendation program for suggesting groups to join in a social network based on a search query, on a computing device within the environment of FIG. 1, in accordance with an exemplary embodiment of the present invention.

FIG. 3 illustrates the operational processes, generally designated 300, of recommendation program 122 for suggesting groups to join in a social network based on a search query, on a computing device within the environment of FIG. 1, in accordance with an exemplary embodiment of the present invention. In process 302, recommendation program 122 receives a search query from a client program 112. In this scenario, a user wants to join a group based on a covered topic (e.g., a hobby such as stamp collecting) or other information that could be used to describe a group. The user enters the search query onto client device 110 and is received by client program 112. Client program 112 sends the query to recommendation program 122. In process 304, recommendation program 122 generates a list of groups that match the received query. For example, group data 126 includes a description of the groups. Recommendation program 122 identifies groups with descriptions that match or contain the search query, generating the list based on groups with the same or similar description of the search query.

In process 306, recommendation program 122 determines a recommendation score for each group in the list. As discussed herein and with reference to FIG. 2, the recommendation score for each group is indicative to the amount of members with a shared properties with relation to the amount of members with unshared properties. While many groups may exist for the search query, the recommendation score helps find groups that have members with similar properties to the user and do not have large amounts of members with dissimilar or unshared properties. In process 308, recommendation program 122 orders the list based on the determined recommendation score for each group. Groups with a larger recommendation score are placed higher in the list. When presented to the user, recommendations that are both relevant to the received search query and the properties of the user provide a better solution for finding groups on a social network.

Figure 4:
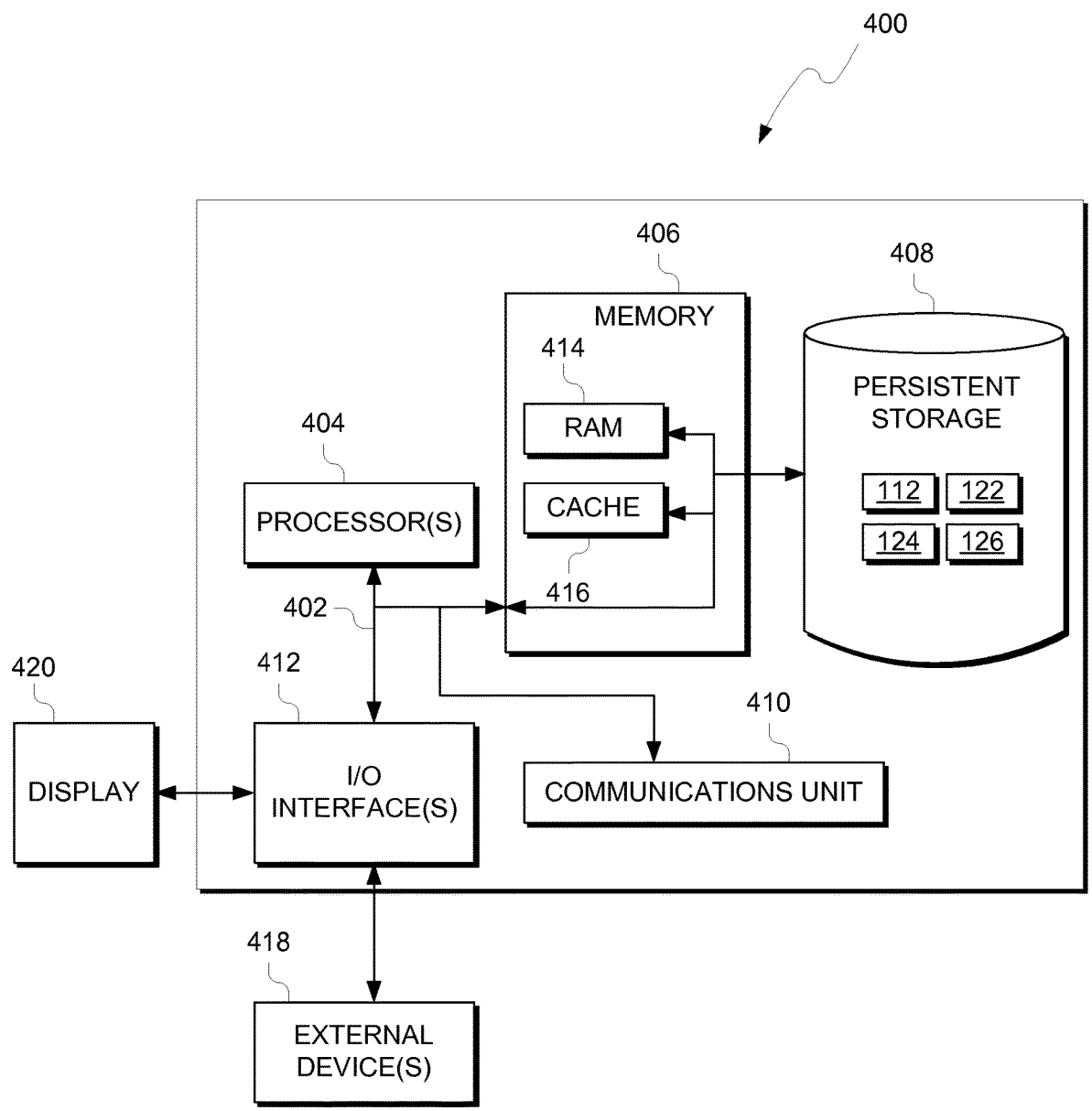
FIG. 4 depicts a block diagram of components of the computing device executing a recommendation program, in accordance with an exemplary embodiment of the present invention.

FIG. 4 depicts a block diagram, 400, of components for each of client device 110 and social network 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client device 110 and social network 120 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Client program 112, recommendation program 122, user data 124 and group data 126 are stored in persistent storage 408, of the respective client device 110 and social network 120, for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Client program 112, recommendation program 122, user data 124 and group data 126 may be downloaded to persistent storage 408 of either client device 110 or social network 120 through the respective communications unit 410 of client device 110 or social network 120.

I/O interface(s) 412 allows for input and output of data with other devices that may be connected to client device 110 or social network 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., client program 112, recommendation program 122, user data 124 and group data 126, can be stored on such portable computer-readable storage media and can be loaded onto persistent storage 408 via I/O interface(s) 412. I/O interface(s) X12 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that some term(s), such as "Smalltalk" and the like, may be subject to trademark rights in various jurisdictions throughout the world and are used here only in reference to the products or services properly denominated by the marks to the extent that such trademark rights may exist.

What is claimed is:

1. A method comprising:
identifying, by one or more processors, a shared property between a user of a social network and a group of the social network based on a first attribute of a profile of the user and at least one profile of one or more members of the group that shares the first attribute;
identifying, by the one or more processors, an unshared property between the user of the social network and the group of the social network based on a second attribute of the profile of the user and at least one profile of the one or more members of the group that does not share the second attribute;
determining, by the one or more processors, a first percentage of the one or more members of the group with the shared property;
determining, by the one or more processors, a shared property score based, at least in part, on the first percentage and a weight associated with the first percentage, wherein the weight associated with the first percentage is equal to zero based, at least in part, on the value of the first percentage being below a predefined threshold;
determining, by the one or more processors, a second percentage of the one or more members of the group with the unshared property;
generating, by the one or more processors, a recommendation score for the group based, at least in part, on a difference between the first percentage associated with the shared property and the second percentage associated with the unshared property; and
sending, by the one or more processors, a recommendation to the user to join the group based, at least in part, on the recommendation score for the group.

2. The method of claim 1, the method further comprising:
determining, by the one or more processors, an unshared property score based, at least in part, on the second percentage.

3. The method of claim 2, wherein the unshared property score is further based, at least in part, on a weight associated with the second percentage.

4. The method of claim 3, wherein the weight changes in value based, at least in part, on the value of the second percentage.

5. The method of claim 4, wherein the step of generating a recommendation score is based, at least in part on, the first percentage, the second percentage and the weight.

6. A computer program product comprising:
one or more computer-readable storage media and program instructions stored on the one or more computer-readable storage media, the program instructions comprising:
program instructions to identify a shared property between a user of a social network and a group of the social network based on a first attribute of a profile of the user and at least one profile of one or more members of the group that shares the first attribute;
program instructions to identify an unshared property between the user of the social network and the group of the social network based on a second attribute of the profile of the user and at least one profile of the one or more members of the group that does not share the second attribute;
program instructions to determine a first percentage of the one or more members of the group with the shared property;
program instructions to determine a shared property score based, at least in part, on the first percentage and a weight associated with the first percentage, wherein the weight associated with the first percentage is equal to zero based, at least in part, on the value of the first percentage being below a predefined threshold;
program instructions to determine a second percentage of the one or more members of the group with the unshared property;

program instructions to generate a recommendation score for the group based, at least in part, on a difference between the first percentage associated with the shared property and the second percentage associated with the unshared property; and program instructions to send a recommendation to the user to join the group based, at least in part, on the recommendation score for the group.

7. The computer program product of claim 6, the program instructions further comprising:
determining, by the one or more processors, an unshared property score based, at least in part, on the second percentage.

8. The computer program product of claim 7, wherein the unshared property score is further based, at least in part, on a weight associated with the second percentage.

9. The computer program product of claim 8, wherein the weight changes in value based, at least in part, on the value of the second percentage.

10. The computer program product of claim 9, wherein the step of generating a recommendation score is based, at least in part on, the first percentage, the second percentage and the weight.

11. A computer system comprising:
one or more computer processors;
one or more computer readable storage media; and
program instructions stored on the computer readable storage media for execution by at least one of the one or more processors, the program instructions comprising:
program instructions to identify a shared property between a user of a social network and a group of the social network based on a first attribute of a profile of the user and at least one profile of one or more members of the group that shares the first attribute;
program instructions to identify an unshared property between the user of the social network and the group of the social network based on a second attribute of the profile of the user and at least one profile of the one or more members of the group that does not share the second attribute;
program instructions to determine a first percentage of the one or more members of the group with the shared property;
program instructions to determine a shared property score based, at least in part, on the first percentage and a weight associated with the first percentage, wherein the weight associated with the first percentage is equal to zero based, at least in part, on the value of the first percentage being below a predefined threshold;
program instructions to determine a second percentage of the one or more members of the group with the unshared property;
program instructions to generate a recommendation score for the group based, at least in part, on a difference between the first percentage associated with the shared property and the second percentage associated with the unshared property; and
program instructions to send a recommendation to the user to join the group based, at least in part, on the recommendation score for the group.

12. The computer system of claim 11, the program instructions further comprising:
determining, by the one or more processors, an unshared property score based, at least in part, on the second percentage.

13. The computer system of claim 12, wherein the unshared property score is further based, at least in part, on a weight associated with the second percentage.

14. The computer system of claim 13, wherein the weight changes in value based, at least in part, on the value of the second percentage.

15. The computer system of claim 14, wherein the step of generating a recommendation score is based, at least in part on, the first percentage, the second percentage and the weight.

* * * * *